United States Patent [19]

Johnson et al.

[11] Patent Number: 5,394,766
[45] Date of Patent: Mar. 7, 1995

[54] ROBOTIC HUMAN TORSO

[75] Inventors: Bruce S. Johnson, Burbank; Robert H. Gurr, Tujunga, both of Calif.

[73] Assignee: The Walt Disney Company, Burbank, Calif.

[21] Appl. No.: 17,821

[22] Filed: Feb. 16, 1993

Related U.S. Application Data

[63] Continuation-in-part of Ser. No. 917,580, Jul. 21, 1992, abandoned.

[51] Int. Cl.$^6$ .......................... B25J 11/00; B25J 9/14; B25J 18/00
[52] U.S. Cl. ................................. 74/490.01; 92/122; 92/125; 40/414; 40/419; 446/176; 446/330; 446/352; 446/354; 901/1; 901/22
[58] Field of Search ............... 74/469, 479 B, 479 BE, 74/479 BF, 479 R; 901/1, 22, 50; 92/2, 140, 122, 125; 434/265, 266, 267, 256; 40/414, 418, 419; 446/176, 197, 198, 199, 330, 352, 353, 354, 376, 301, 383

[56] References Cited

U.S. PATENT DOCUMENTS

| | | | |
|---|---|---|---|
| 624,799 | 5/1899 | Haveis | 40/419 |
| 2,169,380 | 8/1939 | Barrett | 40/418 |
| 3,775,900 | 12/1973 | Thorn et al. | 446/354 |
| 4,279,099 | 7/1981 | Dyer et al. | 446/330 |
| 4,683,773 | 8/1987 | Diamond | 74/479 BF |
| 4,723,932 | 2/1988 | Kelley et al. | 446/330 |
| 5,158,492 | 10/1992 | Rudell et al. | 446/354 X |
| 5,176,560 | 1/1993 | Wetherell et al. | 446/354 X |

OTHER PUBLICATIONS

Robots: Fantasies and Realities, Omni Magazine, U.S. vol. 5, No. 7, Omni Pub. Int, New York, New York.

*Primary Examiner*—Allan D. Herrmann
*Attorney, Agent, or Firm*—Haverstock, Medlen & Carroll

[57] ABSTRACT

A robotic assembly is provided that simulates the size, appearance and movement of a human torso. The torso includes a unique combination of high speed rotary and linear actuators arranged in a geometry that enables anatomically correct human-like movement, and which provides sufficient internal room and mounting surfaces for the actuators and related equipment such as hydraulic or pneumatic lines, electronic control circuits, valves, and audio playback devices. A preferred embodiment of the present invention provides up to nine degrees of freedom. The upper torso includes a pair of rotary arm actuators ("rotacs") for rotating arms up to 200 degrees. The rotacs are pivotally attached to a centrally located mounting structure for up-and-down motion (shoulder shrugging) and for forward-and-back motion (shoulder forward). Movement of each rotac for shrugging and shoulder forward is driven by a pair of linear actuators which are attached between the centrally located mounting structure and the output end of each rotac, with one located at the back (for driving the rotac forward-and-back) and one located above the rotac (for lifting and lowering the output shaft of the rotac). The rotary and linear actuators which move the arms and shoulders can be independently controlled to enable the left arm/shoulder to move independently of the right, or can be ganged together to enable the left and right shoulder/arm to be moved in concert. The lower torso potion of the assembly includes a torso twist rotac which is attached to a base (to which could be connected a leg assembly) such that the output shaft extends vertically upwards. The output shaft of a second rotac is rigidly mounted to the output shaft of the torso twist rotac so that it is held in a substantially horizontal position, thus enabling the housing of the second rotac to rotate about its horizontal output shaft, thus providing a torso sidebend function. The housing of the centrally located mounting structure is pivotally connected to a pair of legs extending away from the housing of the second rotac, and a linear actuator is used to link the centrally located mounting structure to the second rotac-linking the upper and lower torso and providing the torso forebend function.

36 Claims, 12 Drawing Sheets

ROBOTIC HUMAN TORSO

This application is a continuation-in-part of U.S. patent application Ser. No. 07/917,580, filed on Jul. 21, 1992 (now abandoned).

FIELD OF THE INVENTION

The present invention relates to robotics; more particularly, the present invention relates to a robotic assembly that simulates the movement of a human torso.

BACKGROUND OF THE INVENTION

Theme parks, museums, and other educational and entertainment facilities commonly rely on robotic assemblies that simulate the appearance, sound and movements of living or extinct animals for their displays. For example, many museums such as the Smithsonian National Museum of Natural History in Washington, D.C. or the Lawrence Hall of Science in Berkeley, Calif., have sponsored exhibits featuring robotic dinosaurs, mastodons, sabre tooth tigers and other extinct or living species of animals. However, the movement of such robotic creatures is fairly limited—to such things as the movement of neck and head, opening of jaws, movement of one or both forelegs, movement of tail, and sometimes a step by the rear legs, and are typically not able to provide such movement at what would have been normal speed for such creatures. This inability of the robotic creatures to move naturally limits the realism of the displays.

Disneyland ® park, the world-famous theme park, uses Audio-Animatronics ® robotic figures in conjunction with its attractions and rides to simulate humans as well as human and animal characters made famous in Disney ® films. Such figures typically talk and/or sing, and move. The figures are usually provided with a number of hydraulic or pneumatic actuators that move various parts of the robotic assembly. The movements of such figures are also limited, with the torso of a human or human-like figure having generally no more than five degrees of freedom. Such torso movement typically include movement of either arm forward, bowing (torso forebend), tilting the torso from side to side (torso sidebend) and twisting the torso about the waist (torso twist). All of these functions are powered by linear hydraulic or pneumatic cylinders.

Such conventional human or human-like robotic figures have never been able to fully duplicate human torso and shoulder motions at human-like speed because of the difficulty in fitting the necessary actuators and structure into the confines of a body the same size and shape as a human body. The torso mechanisms used in conventional robotic figures contain many compromises, such as limits in the range of motion of many of the joints, and geometry which limits movement and/or space inside the torso. The result is that the ability to realistically duplicate the movement of a human with such a figure is restricted. For example, the human muscle/skeleton system allows us to independently shrug each shoulder, or laterally move one shoulder, without moving the other shoulder. Conventional robotic figures are unable to provide such functions without eliminating one or more existing degree of freedom in the assembly. Additionally, conventional prior art robotic figures typically use a crank-arm linkage system connecting the pneumatic or hydraulic actuators to the joints. Such mechanisms cannot operate through the full human range of motion. For example, the arm forward function is limited to about 100 degrees of travel about the shoulder socket of the robot, as compared to the human range of about 200 degrees.

Most Audio-Animatronics ® figures are constructed to be approximately the same size as a human being. In addition to the linkage system, the hydraulic or pneumatic actuators and hoses, it is desirable to place the valves, electronic control circuits and audio devices within the robotic figure to reduce the number of wires and hoses leading into the figure. The inclusion of all these parts, however, would further reduce the degrees of freedom that could be fit into the torso, and would restrict the ability of the robotic figure to simulate the movement of a human torso. While it would be desirable to add realism to robotic figures by adding more operating functions, which requires more actuators and more moving mechanical parts, the current mechanical design of robotic figures leaves very little extra room for additional functions and components. If adequate room were provided for the additional functions and conventional components which would enable the robotic figure to closely simulate human movement, the robot would be unrealistically large.

Thus, it would be desirable to provide a robotic torso assembly which fits within the physical size of a normal human torso and which is able to closely simulate human torso and shoulder movements.

SUMMARY OF THE INVENTION

The present invention provides a robotic torso which is substantially the same size as a human torso, and in which thee components are arranged in a unique geometry. This geometry provides additional space inside the physical envelope of the torso for the high speed actuators, hoses and other mechanisms which are capable of providing movement at human-like speed. The geometry, in combination with the actuators, provides more functions than existing designs, with a greater range of travel and anatomically correct motion, thus enabling the torso to closely simulate the actual movement of a human torso.

A robotic torso of the present invention is intended to cover the portion of a robotic human-like figure from the waist up, including the shoulders, but excluding the arms, head and neck. A robotic torso of the present invention includes a plurality of actuators that can provide up to nine degrees of freedom for performing the functions of left and right arm forward, left and right shoulder forward, torso forebend, torso left and right sidebend, and torso left and right twist, as well as provide a unique geometrical arrangement of parts which allows sufficient room for all parts needed to perform these functions and provides anatomically correct motion for closely simulating human torso movement. In particular, a robotic torso of the present invention utilizes a unique hydraulic rotary actuator ("rotac") which is taught and claimed in U.S. patent application Ser. No. 07/917,580 filed on Jul. 21, 1992 for "Hydraulic Rotary Actuators for Robotic Applications," by Bruce S. Johnson et al.

At the bottom of a torso of the preferred embodiment of the present invention is a torso twist rotac which functions as a structural element and has about 90 degrees of movement. The housing of the torso twist rotac is rigidly attached to the lower half of the robotic figure (below the waist). A second rotac, preferably identical to the torso, twist rotac, is used to provide the torso sidebend function. The output shafts of the torso twist rotac and the torso sidebend rotac are connected together by a block. Thus, when the torso twist rotac is actuated, the torso sidebend rotac and block are rotated about the vertical axis passing longitudinally through the output shaft of the torso twist rotac, and can be rotated, relative to the front center of the torso, approximately 45 degrees to the right and left. When the torso sidebend rotac is actuated, the housing of the torso sidebend rotac is rotated by the output shaft of the torso sidebend rotac which is fixed in the block.

A rigid A-frame mount forms a breast bone like structure for the robotic torso as well as a mounting surface for the actuators for the torso forebend, left and right shoulder shrug, left and right shoulder forward, and left and right arm forward functions. Each lower leg of the "A" is preferably pivotally attached to one of a pair of brackets, each of which can be mounted opposite the other on the housing of the torso sidebend rotac. A torso forebend linear actuator, such as a conventional hydraulic or pneumatic cylinder, can then be mounted, preferably between the A-frame and the torso sidebend rotac, such that when the forebend cylinder is actuated the legs of the A-frame pivot about their pivotal connection with the pair of brackets and the top of the A-frame is rotated down toward the torso sidebend rotac.

A pair of plates or brackets hinged together along one side are mounted on top of the A-frame, with the hinged connection positioned between the two brackets such that one bracket end extends to the left and another bracket end extends to the right of the hinge. The hinge pin is preferably oriented on the torso so that the central longitudinal axis passing through the hinge pin passes substantially horizontally through the chest and back of the robotic torso. The housing of a left shoulder rotac is pivotally attached to the end of the left hinged bracket so as to pivot about a substantially vertical shaft, and the housing of a right shoulder rotac is pivotally attached to the end of the right hinged bracket so as to pivot about a substantially vertical shaft. The output shaft of the left and right shoulder rotacs extend out to the left and right respectively of the torso to provide a surface for the connecting and rotating a left and right upper arm assembly respectively. Thus, when the left shoulder rotac is activated, the output shaft of that rotac rotates clockwise to raise the left arm from its position at the side of the robotic figure, and counterclockwise to lower the left arm from a raised position to a rest position hanging vertically at the side of the robotic figure. When the right shoulder rotac is activated, the output shaft of that rotac rotates counterclockwise to raise the right arm from its position at the side of the robotic figure, and clockwise to lower the rights arm. The left and right shoulder rotacs each provide about 200 degrees of movement.

A left shoulder forward cylinder is mounted between the back of the A-frame and the left shoulder rotac for pivoting the left shoulder rotac about the vertical shaft connecting it to the left hinged bracket end, causing the output end of the left shoulder rotac to move forward or back, thus simulating forward and back movement of the left shoulder. A right arm forward cylinder is similarly mounted between the back of the A-frame and the right shoulder rotac for pivoting the right shoulder rotac about the vertical shaft connecting it to the right hinged bracket, causing the output end of the right shoulder rotac to move forward or back, thus simulating forward and back movement of the right shoulder.

A "T" shaped mounting structure is also preferably mounted at the top of the A-frame for mounting the remaining actuators for providing independent shoulder shrug functions, with the cross-bar atop the "T" oriented so as to be parallel with the torso shoulders, thus forming a left end and a right end. A right shoulder shrug cylinder is attached between the right end of the "T" cross bar and the right shoulder rotac. Thus, when the right arm shoulder shrug cylinder is activated, the right hinged bracket and the attached right arm rotac pivot about the hinge pin, raising or lowering the right shoulder rotac. Similarly, a left shoulder shrug Cylinder is attached between the left end of the "T" cross bar and the left shoulder rotac, so that when the left arm shoulder shrug cylinder is activated, the left hinged bracket and the attached left shoulder rotac pivot about the hinge pin, raising or lowering the left shoulder rotac.

It is an object of the present invention to duplicate the movement of a human torso in a robotic torso having the same shape and size of a human torso. It is a further object of the present invention to provide a robotic torso having up to nine degrees of freedom. It is yet a further object of the invention to provide a robotic torso which can move within the same range of motion and at the same speed as observed in normal human motion.

These and other objects of the invention will become apparent from the Detailed Description Of The Invention, taken in conjunction with the accompanying drawings, which illustrate, by way of example, the principles of the invention.

BRIEF DESCRIPTION OF THE DRAWINGS

The objects, features and advantages of the present invention will become apparent to one skilled in the art from reading the following detailed description and accompanying drawings, in which.

DESCRIPTION OF THE INVENTION

Figure 1:
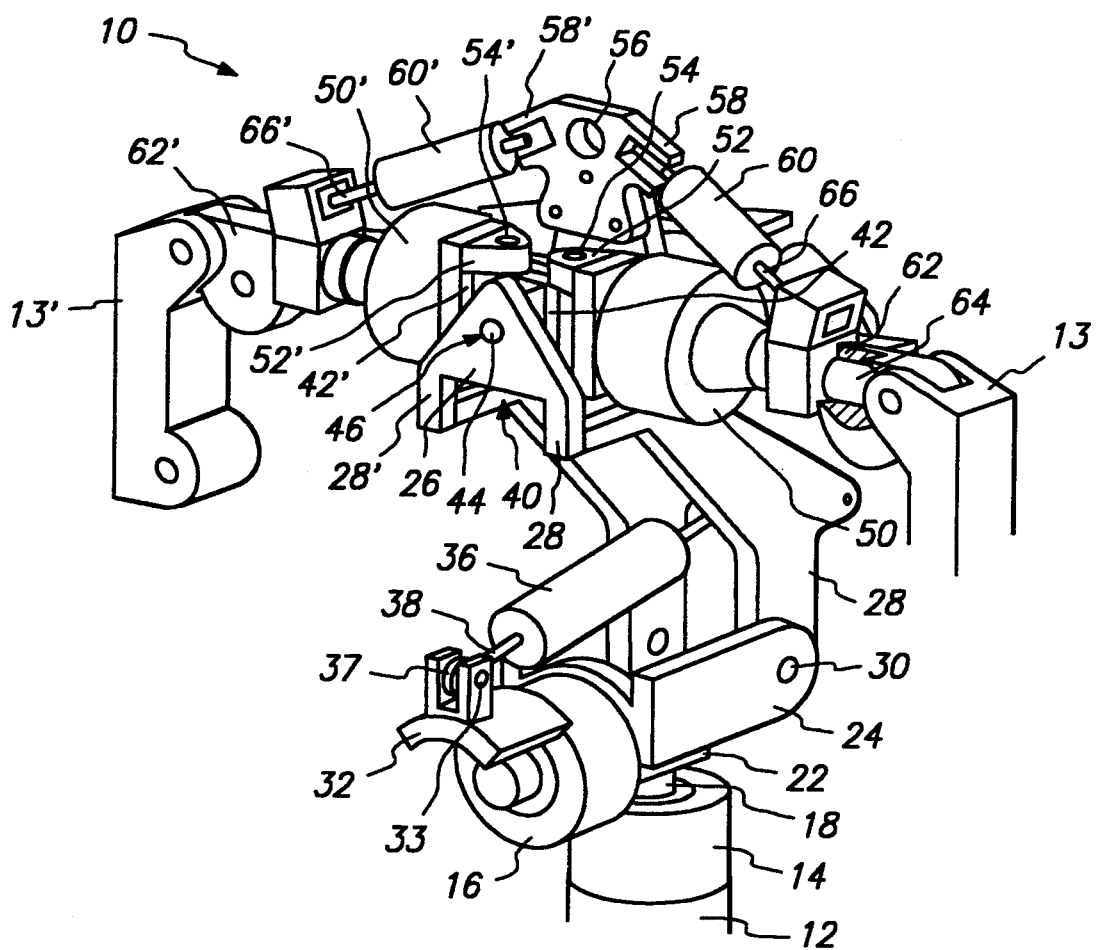
FIG. 1 is a front perspective view of a robotic torso of the present invention.
Figure 2:
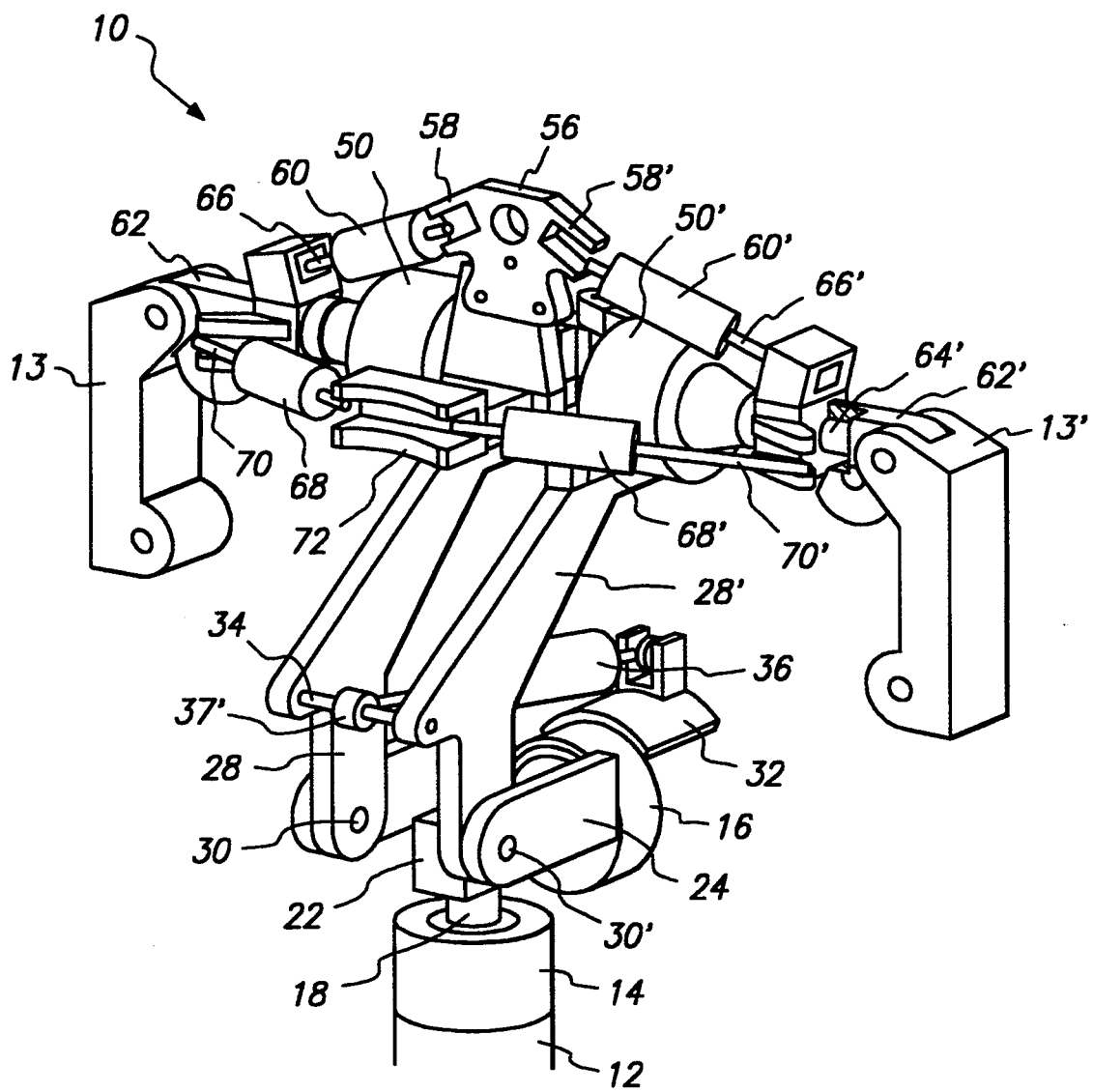
FIG. 2 is a rear perspective view of the robotic torso of FIG. 1.
Figure 3:
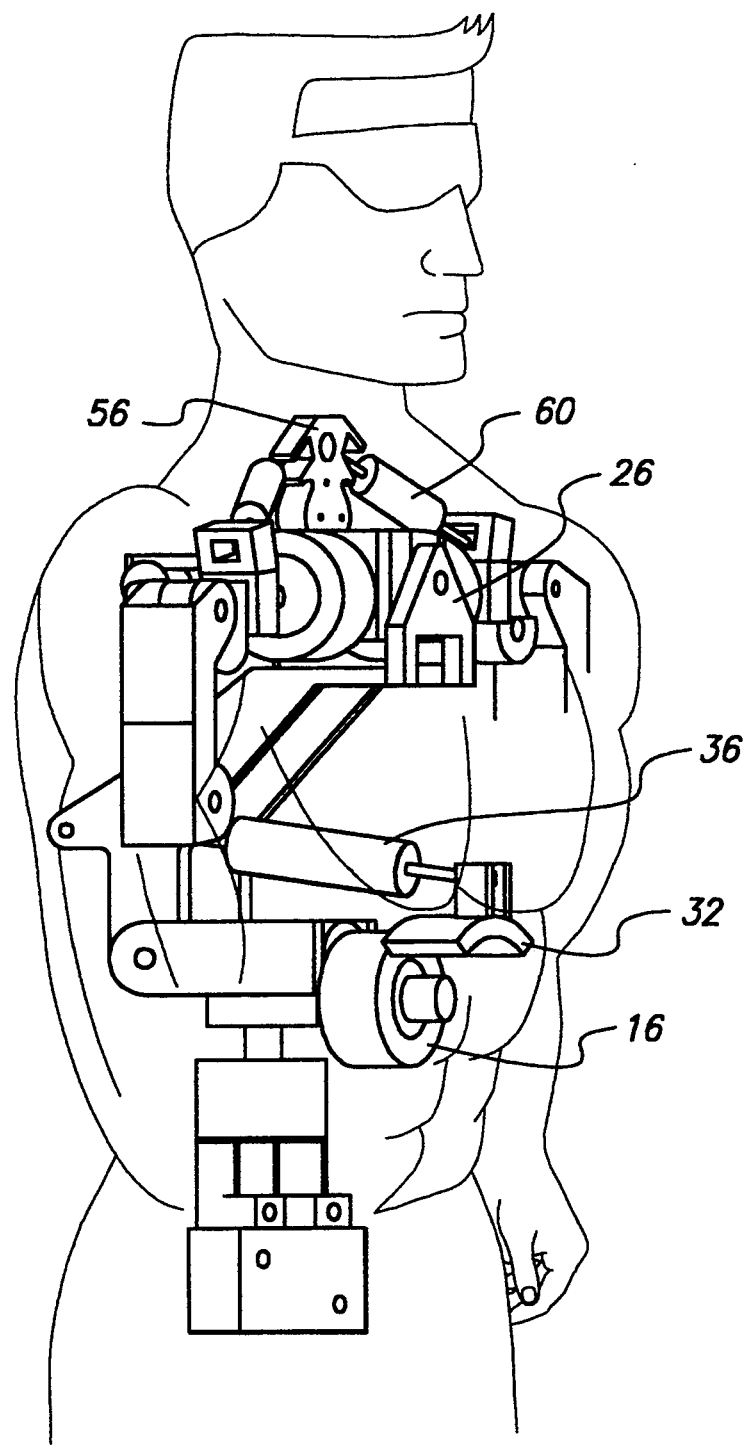
FIG. 3 is a partially cutaway, perspective view of a robotic human-like figure incorporating a robotic torso of the present invention and illustrating one relative position of components as the torso twists to its left during the torso twist function.

As shown in FIGS. 1 and 2, the present invention provides a robotic torso assembly which is substantially the same size as a human torso, and which provides room inside the physical envelope of the torso for linear and rotary high speed actuators, and any hoses, electronic controls, and audio playback mechanisms which may be required or desired, all of which are intended to closely simulate the appearance, movement, size and sound of a human being. A robotic torso assembly of the present invention provides more functions than existing designs, with greater range of travel and anatomically correct motion, while providing additional space in the torso for mounting other components. These advantages are primarily due to the unique geometrical arrangements of the parts and the use, in the preferred embodiment, of a novel hydraulic rotary actuator ("rotac") taught and claimed in U.S. patent application Ser. No. 07/917,580 filed on Jul. 21, 1992, now abandoned, for "Hydraulic Rotary Actuators for Robotic Applications by Bruce S. Johnson et al.

Figure 9:
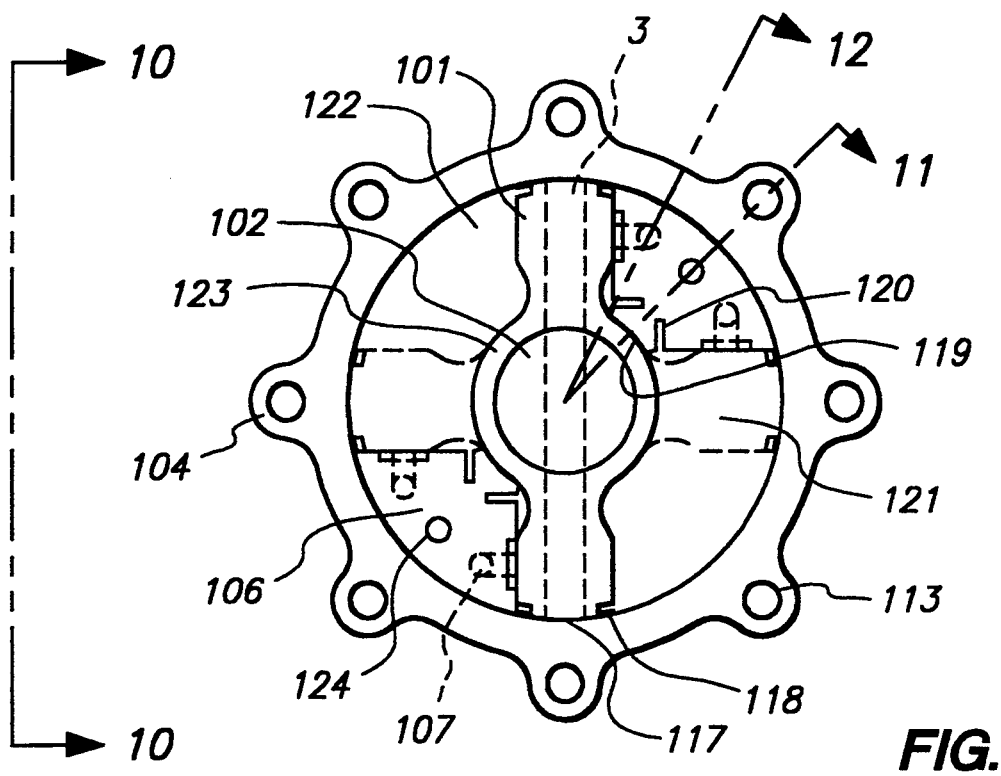
FIG. 9 is a cross-sectional end view of a preferred embodiment of a rotary actuator of the present invention showing the internal parts thereof.

FIG. 9 shows a preferred embodiment of this rotac with a two-lobe rotor, which is suitable for angles of rotation up to approximately 90 degrees. The rotor 101 of FIG. 9 is machined from plastic and is attached to the shaft 102 by a pin 103 which is a press fit into the shaft and rotor. The rotor 101 and the two stationary housing chamber defining vanes 106 fit within the bore of the housing 104, with fluid chambers 122 being formed by the spaces between the rotor and the stationary vanes. The two stationary vanes 106, which are also preferably machined from the same plastic and contain the fluid ports 107, are positively located by dowel pins 124. As fluid under pressure enters the chambers 122 through the appropriate fluid ports 107, the resulting pressure between the rotor 101 and stationary vanes 106 causes the rotor to rotate, turning the shaft 102. The rotor moves through about 90 degrees to a final position 121, where it contacts the opposite faces of the stationary vanes 106.

Hydraulic sealing of the fluid chambers 122 of the rotac is accomplished by simultaneously providing a sliding fit between the moving parts at three principle locations: the interface 117 between the radiused outer ends of the rotor 101 and the housing 104; the interface 119 between the radiused inner ends of the stationary vanes 106 and the hub of the rotor; and the interfaces between each face 123 of the rotor and the two end plates (not shown in FIG. 9). Small slots 118, cut across the outer ends of the rotor 101, define pressure responsive flange-like protrusions at each side of the outer ends of the rotor extending along the length thereof. These pressure responsive flange-like protrusions allow the outer edges of the rotor to flex outwards under the pressure of the fluid in the chamber 122 to increase the effective sealing of the rotor against the inner periphery of the housing 104. For this purpose, the flange-like protrusions are proportioned to provide a strength and flexibility consistent with such things as the maximum pressure of the hydraulic fluid that will be used and the expected rotor and housing wear over the intended life of the rotac. Similar slots 120 defining flange-like protrusions are provided on the inner end of the stationary vanes 106. The flange-like protrusions on the rotor and stationary vanes particularly increase the pressure responsive sealing of the rotor with the housing 104 during periods of high pressure drive for high angular acceleration and deceleration of the rotac supported assembly, yet substantially relax the sealing force during periods of low pressure drive, such as during slow and slowly oscillating movements of the rotac. This has the advantageous result of providing excellent sealing for fast response, yet low friction to avoid jerky motion and hunting that would otherwise be caused by the sticking of high force and high friction seals. The flange-like protrusions also provide some flexibility to compensate for differential thermal expansion between the rotor and housing, and to compensate for rotac shaft bearing radial deflection under high static and/or dynamic loads.

Figure 10:
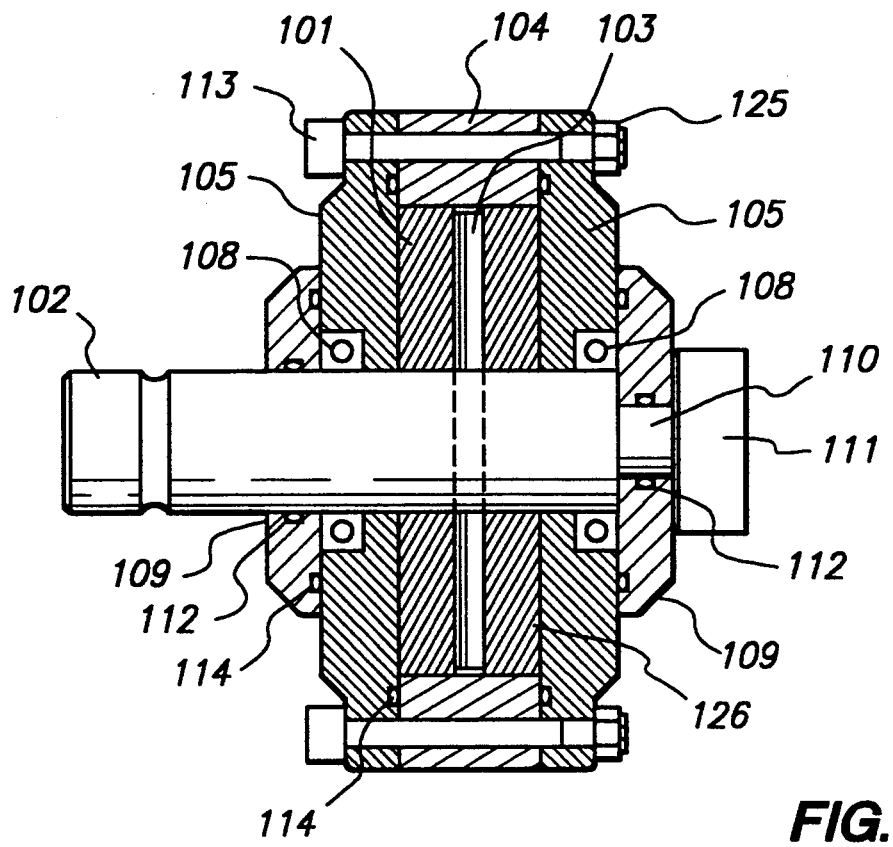
FIG. 10 is a cross-sectional side view of the embodiment of FIG. 9, also showing the internal parts.

FIG. 10 shows the embodiment of FIG. 9 in a cross-sectional side view. The rotor 101 is surrounded by the housing 104 around its outer diameter and by the two flat end plates 105. The end plates 105 and the housing 104 are fastened together by a pattern of bolts 113 and nuts 125 around the periphery of the housing. The shaft 102 is supported by bearings 108 which are fitted into the end plates 105 from the outside and retained by the bearing caps 109. The shaft is reduced in diameter at the back end 110, where it protrudes through the bearing cap 109, and is coupled to an appropriate rotary position-sensing transducer 111. Conventional shaft seals 112 are located in the bearing caps. Static face seals 114 are located between the bearing caps 109 and the end plates 105, and between the end plates and the housing 104 to complete the rotac sealing.

The interface 126 between the rotor 101 and the end plates 105 is a close sliding fit over the entire face of the rotor. This is achieved in a simple, yet highly repeatable manner by first machining the rotor to properly fit the honed internal diameter of the housing 104, then fitting the stationary vanes 106 between the rotor and the housing, and then, with the rotor and stationary vanes accurately fixtured in the housing, facing both the rotor, stationary vanes, and the housing together so that their axial lengths are matched. The precise fit in the final assembly of the rotor between the end plates 105, coupled with the substantial area and low friction between the plastic rotor and the honed surfaces of the end plates 105 and the lubrication provided by the hydraulic fluid, allows the rotor itself to act as a substantially end-play free thrust bearing for the assembly. This allows the use of unpreloaded bearings, and is highly advantageous, as otherwise the bearings would have to be very accurately located and preloaded to provide axial load support and location of the shaft and rotor within the housing. Thus use of the rotor itself for axial support of the shaft eliminates the need for extremely accurate location of the bearings and the accurate preloading of the bearings, and further of course avoids the need for flexible rotor seals that otherwise could be required to fill spaces resulting from tolerances in bearing axial position relative to the housing and rotor.

It will be noted from FIG. 10 that both faces of the rotor are flat over their entire end surfaces, and that except for the seal grooves and bolt holes, the corresponding faces of the housing and end plates are flat over their entire faces also. However, this is not an absolute requirement of the invention provided such surfaces are flat over certain important regions thereof. For instance, it is important that at least an annular portion of each housing end surface joining on its inner diameter the inner diameter of the housing be flat to positively and directly define the length of the housing chamber. It is also important that each end plate be flat from an outer diameter exceeding the rotor diameter (to properly mate with the respective flat end surface of the housing defining one end of the housing chamber) to a diameter less than the diameter of the rotor hub to seal against the end surfaces of the stationary vanes and rotor. Similarly, the rotor need only have flat end surfaces from its outer diameter to a diameter less than the diameter of the rotor hub to properly seal against the adjacent end plate surfaces, and the rotor and stationary vanes may have one or more depressions in one or both end surfaces thereof provided the integrity of the respective sealing surface is not broken, and in the case of the rotor, provided an adequate area is left to satisfactorily act as the thrust bearing for the assembly.

Figure 11:
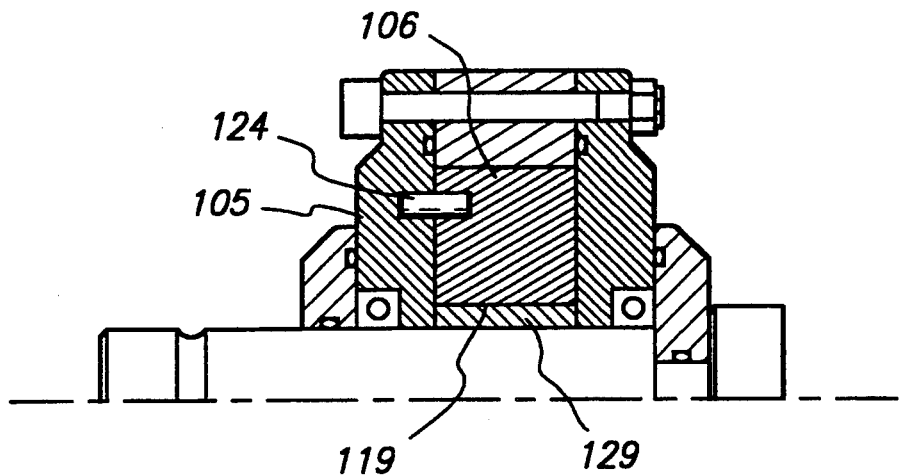
FIG. 11 is a cross-sectional side view detail of the embodiment of FIG. 9 showing the connection between the stationary vane and the end plate.

FIG. 11 shows a cross-section of the embodiment of FIG. 9 through the center of the stationary vane 106, where a dowel pin 124 locates the stationary vane to the end plate 105. The interface 119 between the stationary vane 106 and the hub 129 of the rotor is a sliding fit.

Figure 12:
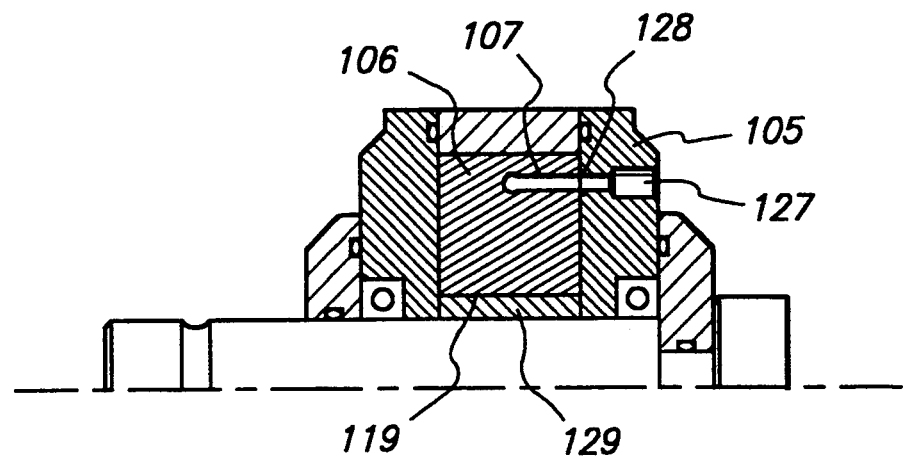
FIG. 12 is another cross-sectional side view detail of the embodiment of FIG. 9 showing the hydraulic fluid passageways between the stationary vane and the end plate.

FIG. 12 shows a cross-section through the stationary vane 106, where a fluid port 107 in the stationary vane intersects a fluid port 127 in the end plate 105. A small seal 128 fits into a recess in the end plate 105 to prevent fluid leakage.

Figure 13:
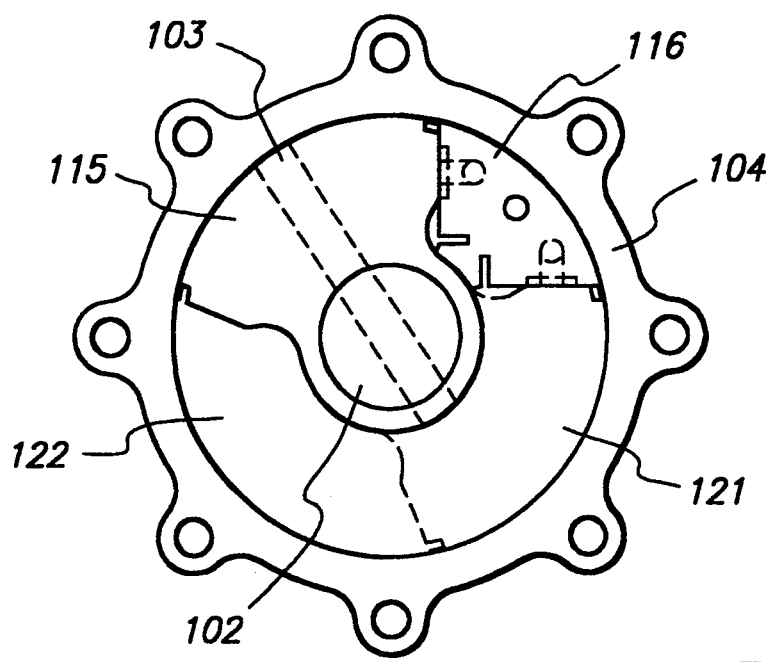
FIG. 13 is a cross-sectional end view of an alternate embodiment of a rotary actuator which uses a single lobe rotor for a larger angle of rotation.

FIG. 13 shows another embodiment of the rotac which uses a one-lobe rotor 115 and a single stationary vane 116. The rotor 115 is attached to the shaft 102 by a pin 103, and fits within the housing 104. The rotor 115 will rotate approximately 270 degrees to a final position 121, but with only one hydraulic chamber 122 formed, this embodiment has half the torque of the two-lobe version for a given size rotac.

Figure 14:
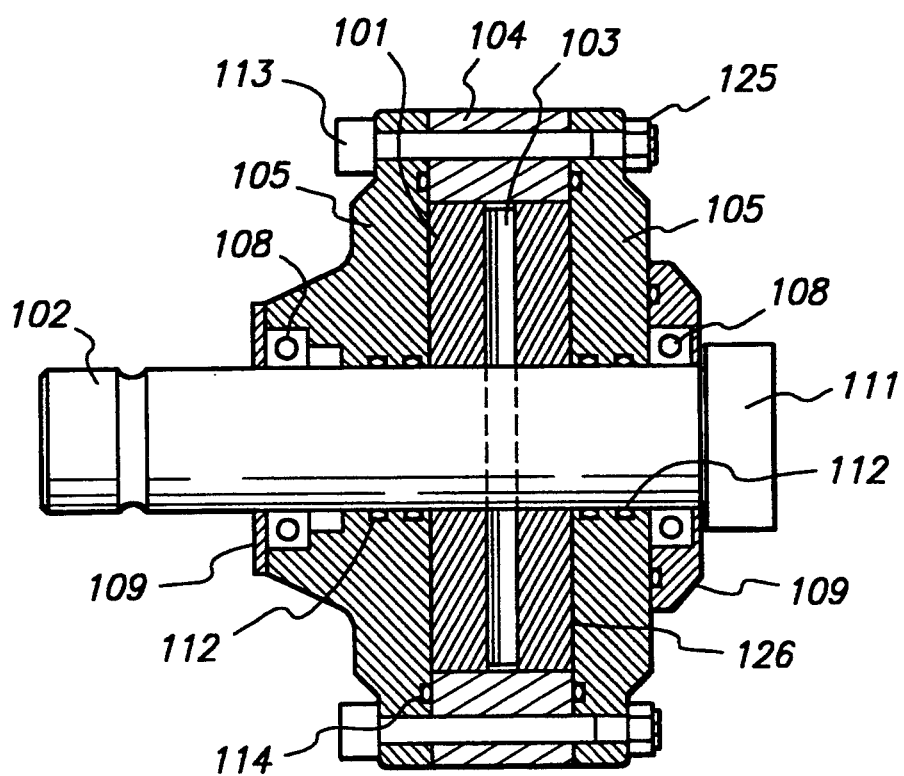
FIG. 14 is a cross-sectional side view of another preferred embodiment of a rotary actuator of the present invention having increased bearing separation and thus increased shaft stiffness to torques on the shaft perpendicular to the axis thereof; and, FIG. 15 is a diagram illustrating the independent control of the actuators of the present invention using conventional valves and a controller.

As an alternative to the rotac designs disclosed herein, it may be desirable to reverse the axial position of the bearings and shaft seals, thereby further physically separating the bearings. Such an embodiment may been seen in FIG. 14. While this removes the bearings from the lubricative hydraulic fluid, permanently lubricated and substantially sealed bearings are available, and the greater separation of the bearings significantly increases the stiffness of the bearing support with respect to moments between the shaft and housing perpendicular to the axis of the rotac.

Returning now to the invention, the Robotic torso 10 as shown in FIGS. 1–8, covers the portion of a robotic human-like figure from the waist up, including the shoulders, but excluding the arms, head and neck. Robotic torso 10 can be used in conjunction with a head assembly (not shown) and a left and right arm assembly to depict the upper body of a human figure. A leg assembly can be added if it is desired to depict a full figure. The upper portion of arms 13, 13' have been depicted in the Figures and discussed in the specification below to illustrate the motion of the shoulder mounted rotacs. As will be described in more detail below, a robotic torso of the present invention can perform the functions of: left arm forward, right arm forward, left shoulder forward, right shoulder forward, left shoulder shrug, right shoulder shrug, torso forebend, torso sidebend (left and right), and torso twist (left and right). Furthermore, the geometrical arrangement of parts allows for anatomically correct human motion and room for mounting or accommodating the actuators and associated equipment inside the torso.

Beginning with the lower portion of a torso of the preferred embodiment of the present invention, as shown in FIGS. 1 and 2 is a torso twist rotac 14 which functions as a structural element and has about 90 degrees of movement. The housing of the torso twist rotac 14 is rigidly attached to a base 12 which can be any rigid structure within the lower half of the robotic figure (below the waist). A second rotac 16, preferably identical to the torso twist rotac 14, is used to provide the torso sidebend function, and will thus be referred to hereafter as the "sidebend rotac." The output shafts 18, 20 of the torso twist rotac 14 and the sidebend rotac 16 are connected together by a coupling block 22, with the torso twist rotac output shaft 18 oriented in a generally vertical position and the sidebend rotac output shaft 20 oriented in a generally horizontal position. The output shafts of the rotacs 14 and 16 can be pinned, press-fit or secured to the coupling block 22 by other means known in the art. When the torso twist rotac 14 is actuated, the sidebend rotac 16, coupling block 22, and all components mounted above them are rotated about the vertical axis passing longitudinally through the output shaft 18 of the torso twist rotac 14. When output shaft 18 of the torso twist rotac rotates clockwise from center (when viewed from above) the torso twists to its right, preferably about 45 degrees. When output shaft 18 of the torso twist rotac rotates counterclockwise from center (when viewed from above) the torso twists to its left, preferably about 45 degrees.

Figure 4:
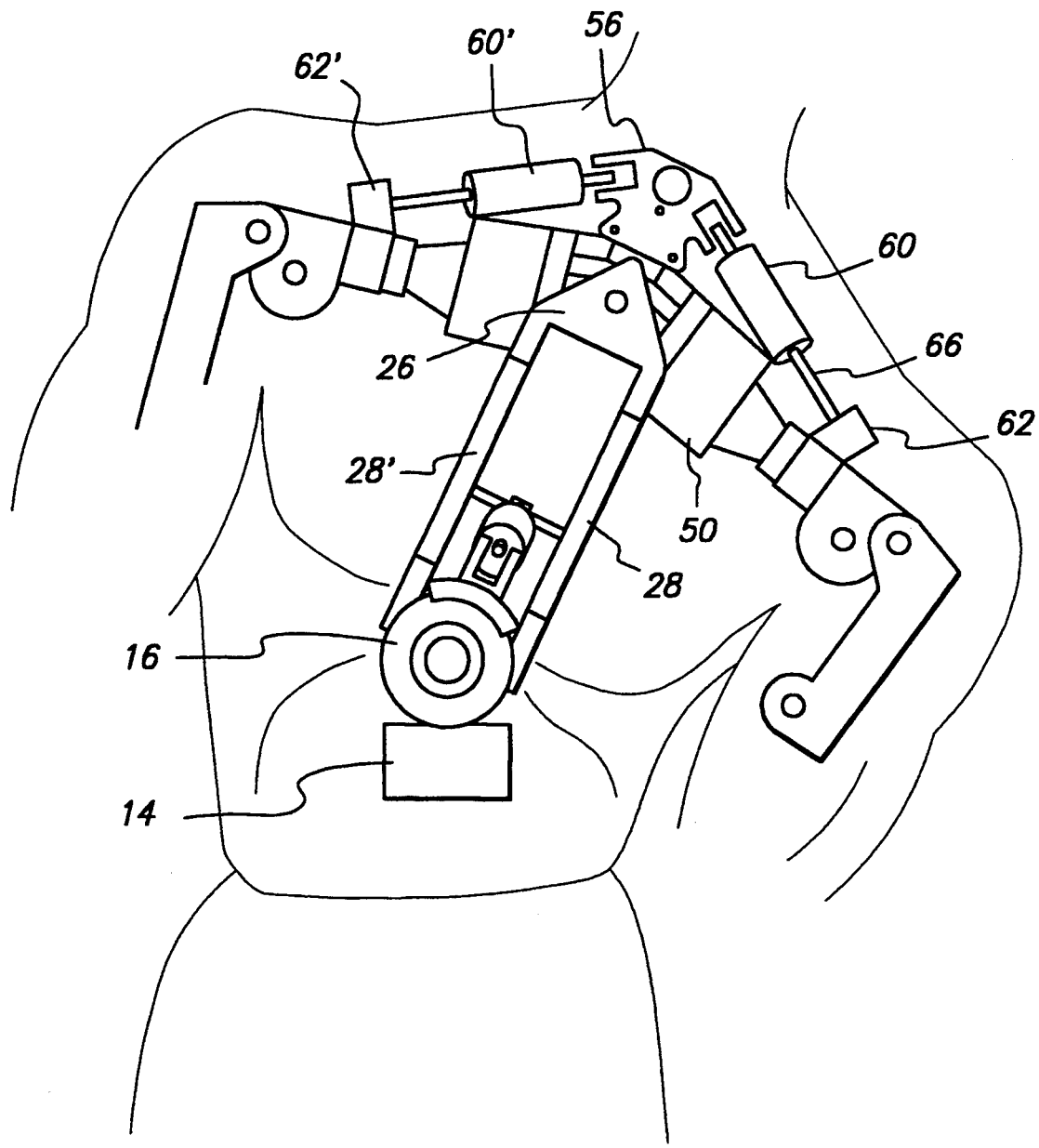
FIG. 4 is a partially cutaway, perspective view of a robotic human-like figure incorporating a robotic torso of the present invention and illustrating one relative position of components as the torso bends to its left side during the torso sidebend function.

When the sidebend rotac 16 is actuated, the housing of the sidebend rotac 16, and any components attached to the housing, are rotated by the output shaft 20 of the sidebend rotac 16 which is mounted in coupling block 22 about a longitudinal axis passing through the center of the output shaft 20. Thus, when the output shaft 20 is driven clockwise (as viewed from the back in FIG. 2) the housing of the sidebend rotac rotates counterclockwise and the robotic figure will bend at the waist to its right side, as shown in FIG. 4, preferably up to about 45 degrees from vertical. When the output shaft 20 is driven counterclockwise (as viewed from the back) the housing of the sidebend rotac 16 rotates clockwise and the robotic figure will bend at the waist to its left side preferably up to about 45 degrees from vertical.

The housing of the sidebend rotac also preferably includes a bracket 24 having an arm spaced away from and extending rearward along either side of the output shaft 20 for attaching a rigid bilateral mounting structure such as the A-Frame shaped structure 26 which forms a breast bone like structure forming the upper portion of the robotic torso 10 and provides a mounting surface for the actuators for the torso forebend, left and right shoulder shrug, left and right shoulder forward, and left and right arm forward functions. Each lower leg 28, 28' of the A-frame 26 is preferably pivotally attached to an arm of bracket 24 such that the legs 28, 28' of the A-Frame 26 can pivot about a substantially horizontal axis passing through the pins 30, 30'.

The housing of the sidebend rotac 16 also preferably includes a clevis plate 32 mounted to its front surface. A first conventional linear actuator, such as for example a hydraulic or pneumatic cylinder 36, hereinafter referred to as the "forebend cylinder" is preferably mounted between rod 34 at the back of A-frame 26 and clevis plate 32 to provide an actuator for rotating the A-frame and all attached components about the horizontal axis passing through the pins 30, 30'. The forebend cylinder 36, as with the other cylinders discussed herein, can be provided with an eye 37' at one end and a cylinder rod 38 received in a bore at the other end. Cylinder rod 38 terminates in an eye 37. The forebend cylinder piston is attached by passing a clevis pin 33 through the eye 37 after it has been placed between and aligned with the two openings in the clevis plate 32, and by inserting rod 34 through eye 37' to attach the cylinder 36 to the lower legs 28, 28' of the A-Frame 26. Spacers can be provided on the clevis pin 33 or the rod 34 to prevent the eyes 37, 37' of forebend cylinder 36 from sliding along pin 33 or rod 34. Thus, when pressure is increased in forebend cylinder 36, rod 38 is driven out of the bore in forebend cylinder 36, forcing cross bar 40 of A-Frame 26 away from clevis plate 32 as legs 28, 28' of A-Frame 26 pivot about the horizontal axis passing through the pins 30, 30' and away from clevis plate 32, thus moving the torso 10 to an erect, upright posture. As shown more clearly in FIG. 5, when pressure is decreased in forebend cylinder 36, rod 38 retracts into forebend cylinder 36 and A-Frame 26 moves toward clevis 32 as the leg 28 of A-frame 26 pivots about the horizontal axis passing through the pin 30, thus bending the torso 10 forward at the waist to a bowing posture. In the preferred embodiment, as shown in FIGS. 1, 2, end 5 the forebend cylinder 36 can rotate the lower legs 28, 28' of the A-Frame 26 through a total arc of approximately 30 degrees: 20 degrees from an erect position toward the clevis plate 32 and 10 degrees from an erect position away from the clevis plate 32.

Figure 5:
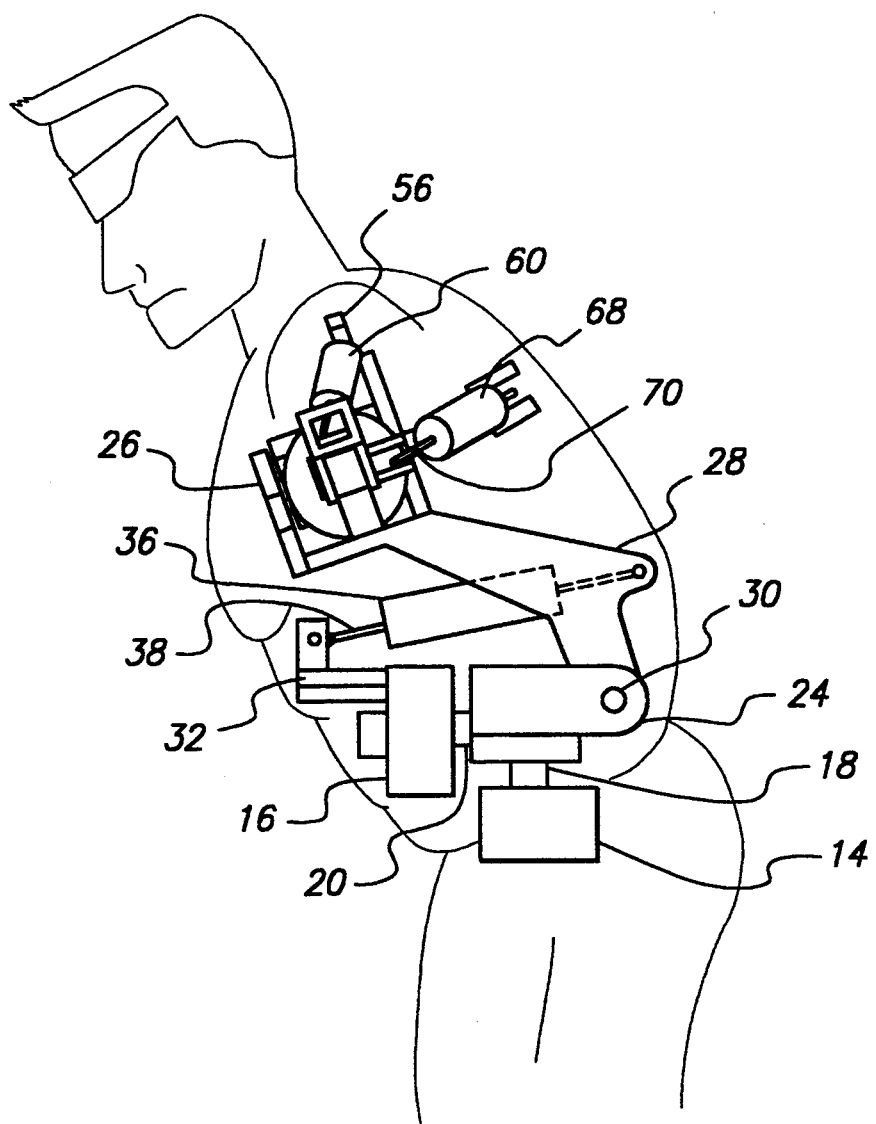
FIG. 5 is a partially cutaway, perspective view of a robotic human-like figure incorporating a robotic torso of the present invention and illustrating one relative position of components as the torso bends forward during the torso forebend function.
Figure 6:
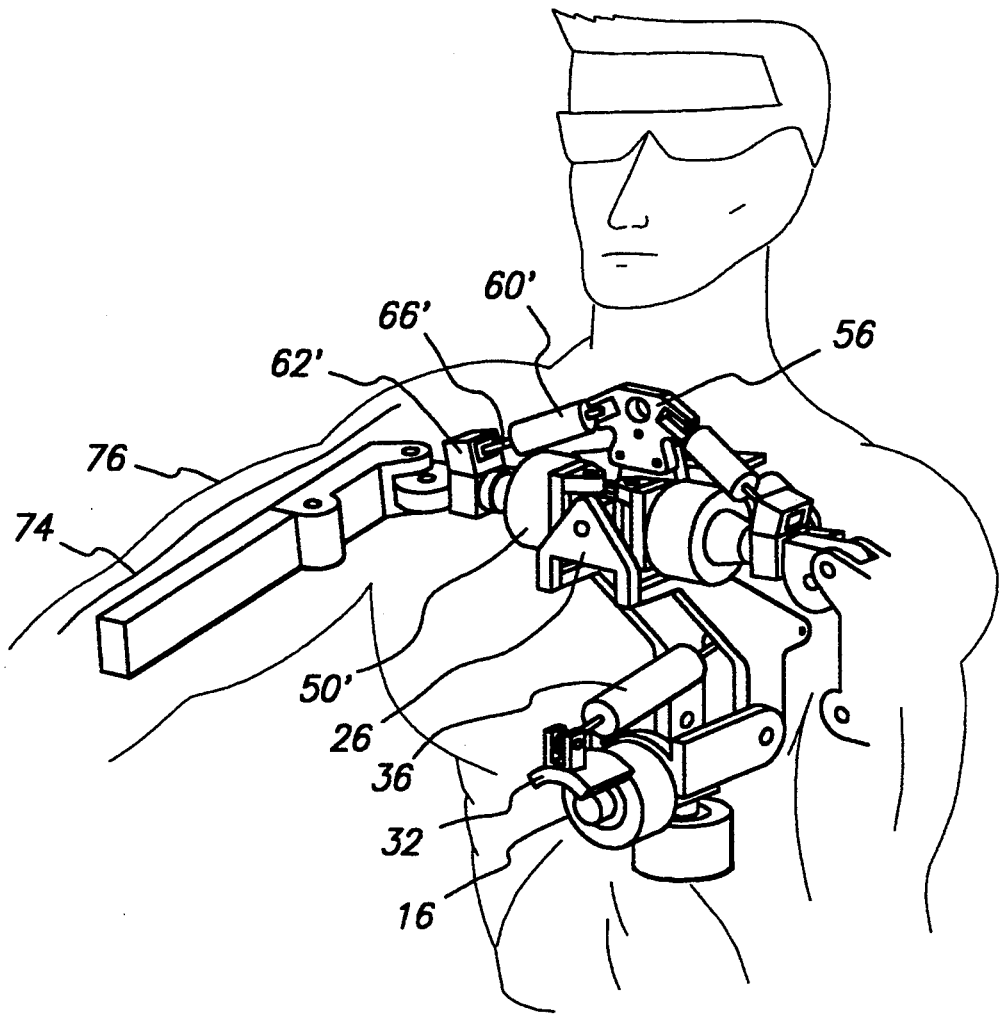
FIG. 6 is a partially cutaway, perspective view of a robotic human-like figure incorporating a robotic torso of the present invention and illustrating one relative position of components as the right shoulder rotac rotates to raise the right arm.

As will be appreciated from this description, and FIGS. 1, 2, and 5, the geometry of the parts discussed above are such that the "waist" of the robotic torso is the approximate location where the distance between the output shaft 18, output shaft 20, and the axis passing through pins 30, 30' is a minimum.

A pair of brackets 42, 42' which are hinged together along one end with a hinge pin 44 can be mounted to the top of A-frame 26, for example by mounting the end of hinge pin 44 in bore 46 as shown in FIG. 1, in order to provide a mounting surface for the pivotable movement of the shoulders up and down, The hinge pin 44 is preferably oriented on the torso 10 so that the central longitudinal axis passing through the hinge pin 44 passes substantially horizontally through the chest and back of the robotic torso 10, to provide for upward pivotal movement of the shoulders of the robotic torso 10 about the longitudinal axis of hinge pin 44.

A bore (not shown) can be provided in the end of left bracket 42, for pivotally attaching a left shoulder rotac 50 for movement forward and back, and a bore (not shown) can be provided in the end of right bracket 42' for pivotally attaching a right shoulder rotac 50' for movement forward and back. A clevis 52, 52' with vertically oriented openings can be mounted to the end of each left and right shoulder rotac 50, 50' respectively for attaching left shoulder rotac 50 to bracket 42 and for attaching right shoulder rotac 50' to bracket 42'. The left shoulder connection is formed by interposing the end of bracket 42 between the openings in clevis 52 so that the left bracket bore (not shown) is aligned with the openings in clevis 52, and inserting a clevis pin 54 through the clevis 52 openings and bore. The right shoulder connection is formed by interposing the end of bracket 42' between the openings in clevis 52' so that the right bracket bore (not shown) is aligned with the openings in clevis 52', and inserting a clevis pin 54' through the clevis 52' openings and right bracket bore. As shown in FIG. 1, when these connections are made, the clevis pins 54, 54' are oriented vertically (e.g., they have substantially vertical longitudinal axis) when the torso is in its upright posture, which enables the left and right shoulder rotacs 50, 50' to pivot forward and back about the clevis pins 54, 54'.

Figure 7:
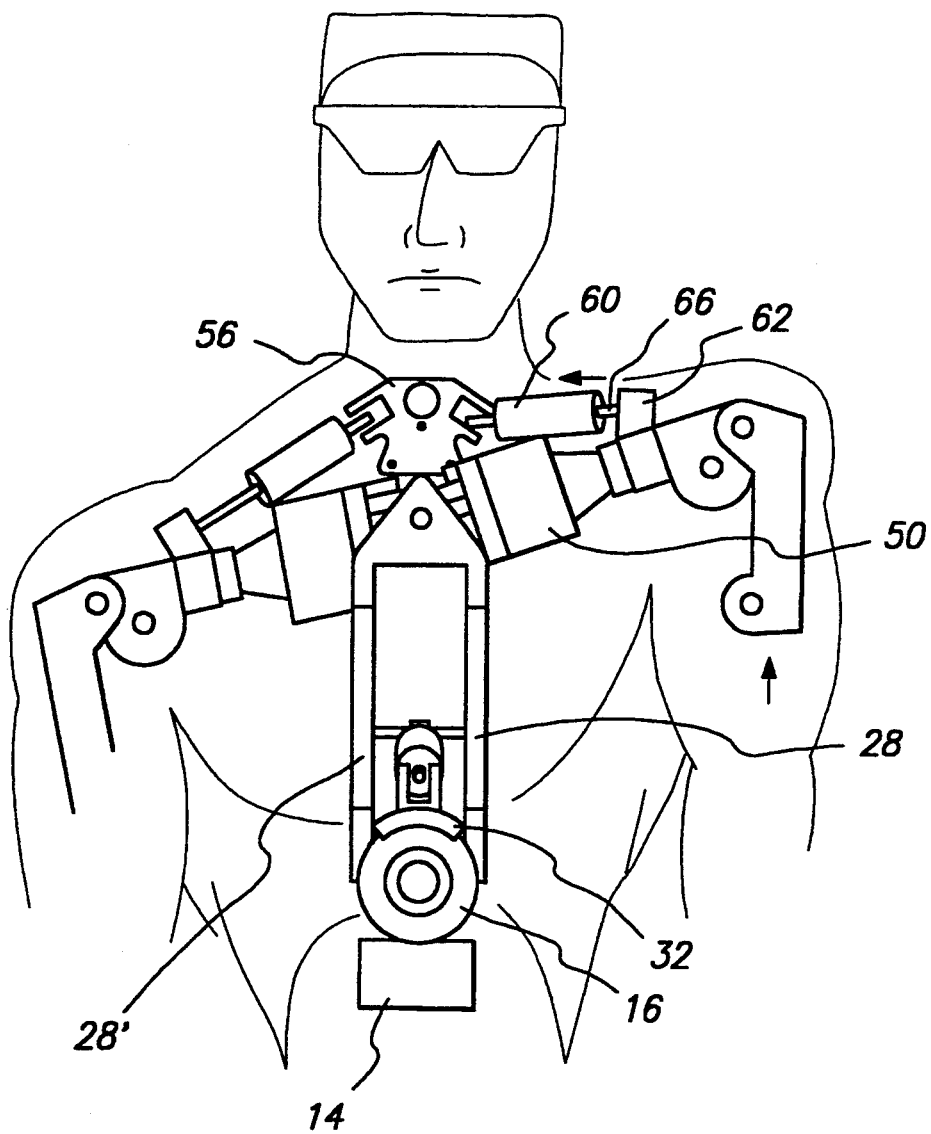
FIG. 7 is a partially cutaway, perspective view of a robotic human like figure incorporating a robotic torso of the present invention and illustrating one relative position of components as the left shoulder shrugs during the left shoulder shrug function.

Independent upward movement of the left and right shoulder rotacs 50, 50' is accomplished by mounting a conventional linear actuator, for example a pneumatic or hydraulic cylinder, above each shoulder rotac. A T-mount 56 can be mounted on top of the A-Frame behind the hinged brackets 42, 42' to form the equivalent of the top of the spine in a human. Each end of the cross-bar at the top of the "T" mount 56 terminates in a clevis, with the left clevis 58 aligned with left rotac 50 and right clevis 58' aligned with right rotac 50'. A second conventional linear actuator, such as for example a hydraulic or pneumatic cylinder 60, hereinafter referred to as "left shoulder shrug cylinder 60" is attached at one end to the left clevis 58 and at the other end to the end of the left rotac 50 using, for example, an adapter 62 constructed to fit over the output shaft 64 or the housing of rotac 50 adjacent to the output shaft 64. For convenience, a clevis can be formed on the adapter 62 to provide an easy connection between the cylinder 60 and the adapter 62. A bearing can be provided in the adapter to permit the output shaft 64 of the left rotac to freely turn in the adapter 62. The same kind of connection can be made at the right shoulder, with a third conventional linear actuator—right shoulder shrug cylinder 60'—connected at one end to clevis 58' and at the other end to a clevis formed on the end of the right adapter 62', which can contain a bearing through which the output shaft 64' passes, and which enables the output shaft to freely turn. Thus, as shown in FIG. 7, when the left shoulder shrug cylinder 60 is retracted by hydraulic or pneumatic means, the cylinder rod 66 retracts into the cylinder 60, pulling against the adapter 62 and causing the end of the left shoulder rotac 50 to rise as the left bracket 42 to which rotac 50 is attached rotates up about hinge pin 44. When the left shoulder shrug cylinder 60 is extended by hydraulic or pneumatic means, the cylinder rod 66 is pushed out of cylinder 60, pushing against the adapter 62 and causing the end of the left shoulder rotac to move downward as the left bracket 42 to which rotac 50 is attached rotates down about hinge pin 44. The same relationship exists in the right shoulder, so that when the right shoulder shrug cylinder 60' is retracted, the cylinder rod 66' retracts into the cylinder 60', pulling against the adapter 62' and causing the end of the right shoulder rotac 50' to rise as the right bracket 42' to which rotac 50' is attached rotates up about hinge pin 44. When the right shoulder shrug cylinder 60' is extended, the cylinder rod 66' is pushed out of cylinder 60', pushing against the adapter 62' and causing the end of the right shoulder rotac 50' to move downward as the right bracket 42' to which rotac 50' is attached rotates down about hinge pin 44.

Figure 15:
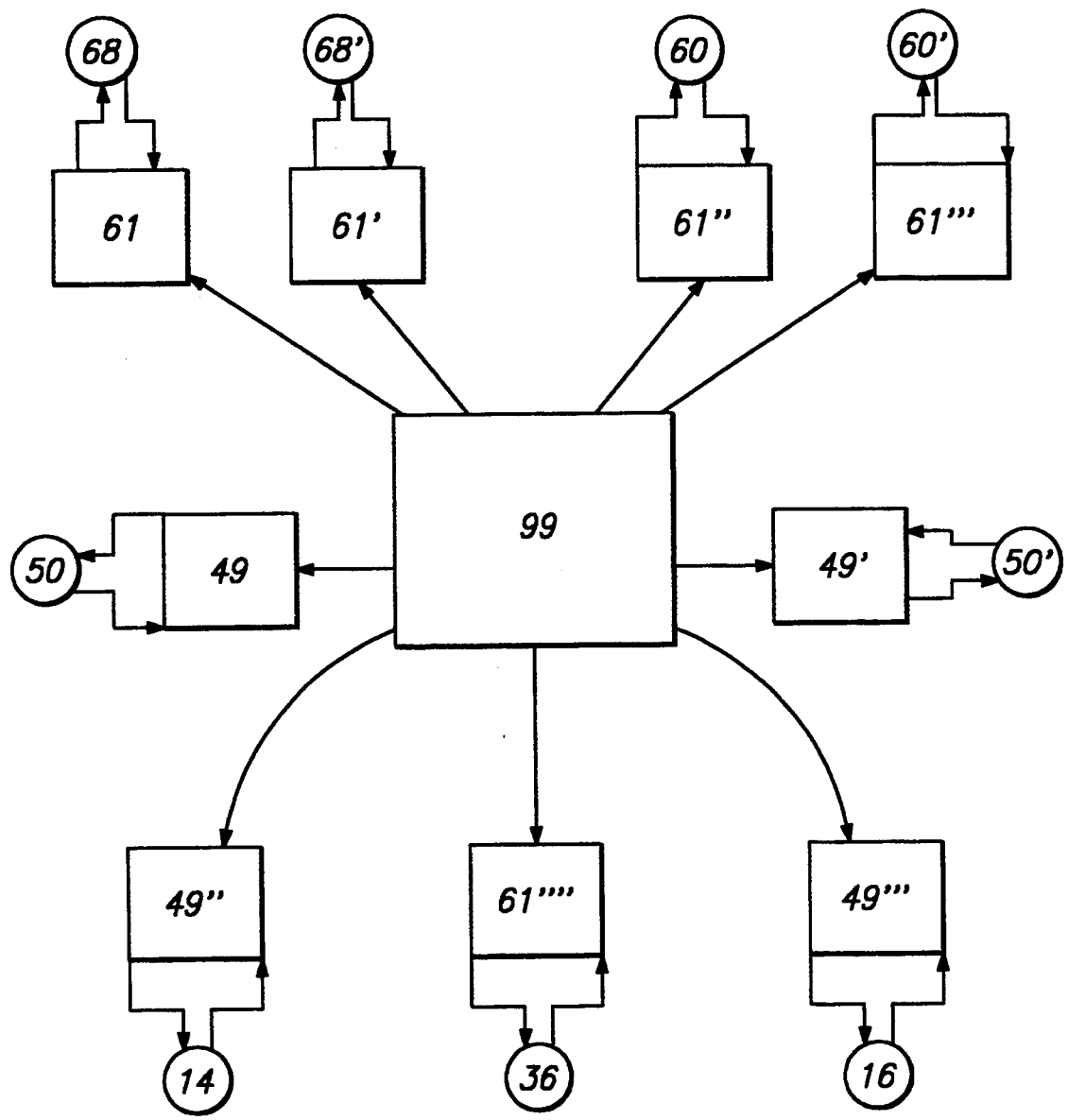

The shrug cylinders 60, 60' can be connected to separate control valves 61, 61 [shown in FIG. 15] that can activate the cylinders independently from each other, thus providing the ability for the torso to shrug each shoulder independently. Such an arrangement more closely simulates the movement of a human torso, in which each shoulder can be moved independently from the other shoulder. In the preferred embodiment, each shrug cylinder can move the hinged brackets 42, 42' and attached shoulder rotacs 50, 50' through an arc of approximately 15 degrees.

Figure 8:
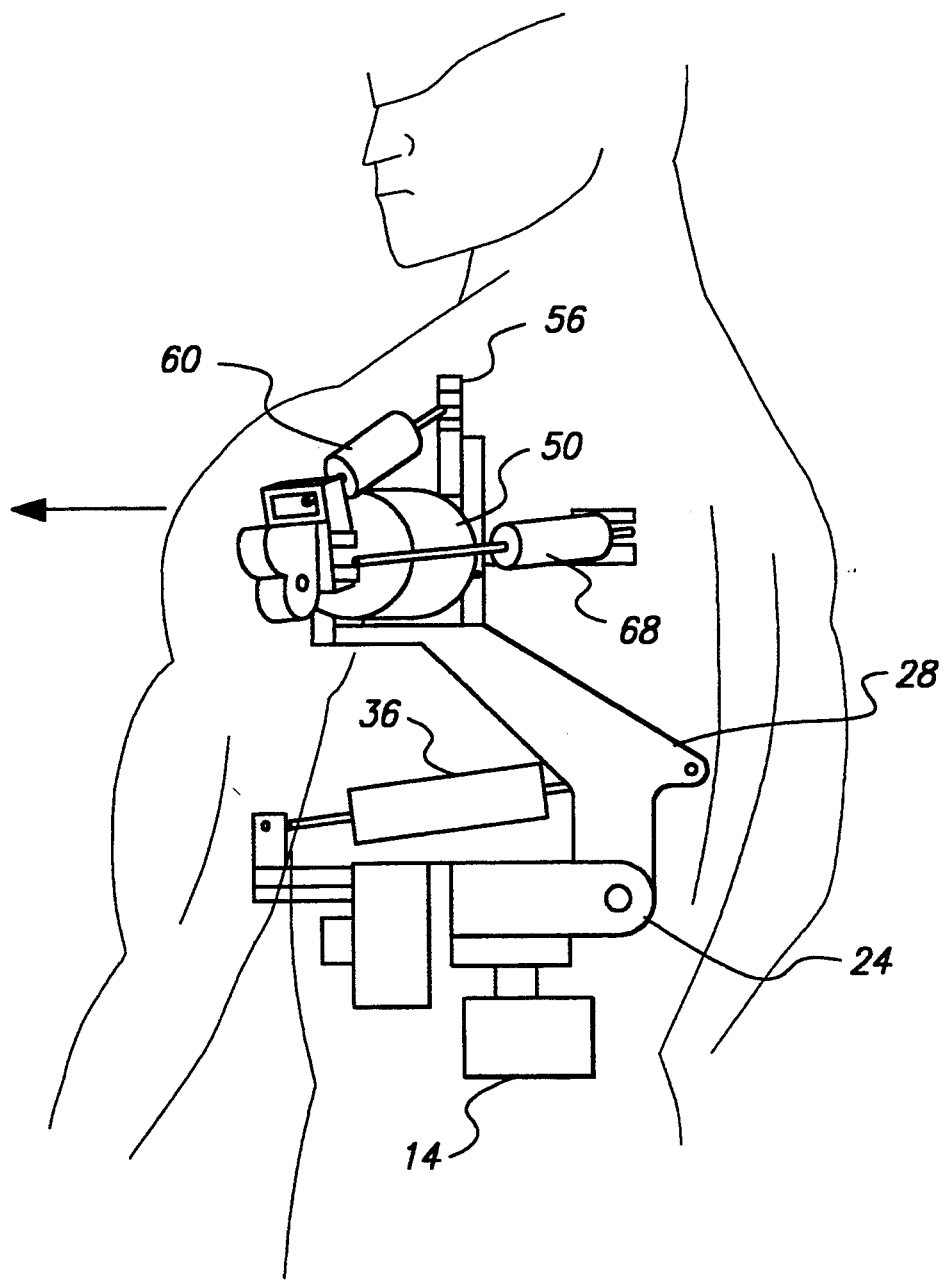
FIG. 8 is a partially cutaway, perspective view of a robotic human like figure incorporating a robotic torso of the present invention and illustrating one relative position of components as the left shoulder is forced forward during the left shoulder forward function.

Likewise, independent forward movement of the left and right shoulder rotacs 50, 50' can be accomplished by mounting a fourth and fifth conventional linear actuator, such as pneumatic or hydraulic cylinders 68, 68', behind each shoulder rotac 50, 50'. This can be achieved, for example, by mounting one end of a left shoulder forward cylinder 68 to a bracket 72 at the rear base of the T-mount 56 or top rear of the A-Frame 26, and the other end of the left shoulder forward cylinder 68 to the end of left shoulder rotac 50, for example by attaching to a clevis formed for the purpose on adapter 62. The right shoulder forward cylinder 68' can be attached in a similar manner, for example by mounting one end of the right shoulder forward cylinder 68' to a bracket 72 at the rear base of the T-mount 56 or top rear of the A-Frame 26, and the other end of the right shoulder forward cylinder 68' to the end of right shoulder rotac 50', for example by attaching to a clevis formed for the purpose on adapter 62'. Thus, when the left shoulder forward cylinder 68 is retracted by hydraulic or pneumatic means, the cylinder rod 70 retracts into the cylinder 68, pulling against the adapter 62 and causing the end of the left shoulder rotac 50 to move back as the clevis 52 attached to the housing of left shoulder rotac 50 rotates about clevis pin 54. As shown in FIG. 8, when the left shoulder forward cylinder 68 is extended, the cylinder rod 70 is pushed out of cylinder 68, pushing against the adapter 62 and causing the end of the left shoulder rotac 50 to move forward as the clevis 52 attached to the housing of rotac 50 rotates about clevis pin 54. Similarly, when the right shoulder forward cylinder 68' is retracted, the cylinder rod 70' retracts into the cylinder 68', pulling against the adapter 62' and causing the end of the right shoulder rotac 50' to move back as the clevis 52' attached to the housing of right shoulder rotac 50' rotates about clevis pin 54'; when the right shoulder forward cylinder 68' is extended, the cylinder rod 70' is pushed out of cylinder 68', pushing against the adapter 62' and causing the end of the right shoulder rotac 50' to move forward as the clevis 52' attached to the housing of rotac 50' rotates about clevis pin 54'. The shoulder forward cylinders 68, 68' are each connected to a separate control valve 61", 61''' [shown in FIG. 15] so that the shoulder rotacs 50, 50' can move independently from each other. This independent movement of the shoulder rotacs closely simulates the movement of a human torso, which can move the shoulders forward either together or independently of each other. In the preferred embodiment, the shoulder forward cylinders 68, 68' can move each shoulder rotac 50, 50' through a total arc of approximately 25 degrees: 15 degrees from a center position forward and 10 degrees from a center position to the rear.

A left arm 13 can be attached to the output shaft 64 of left shoulder rotac 50, and a right arm 13' can be attached to the output shaft 64' of right shoulder rotac 50' for independent movement of the arms forward and above the head. The arms can be attached to the output shafts by pins, a press fit or other means known in the art, if it is desirable to provide simple forward motion of the arms. Thus when left shoulder rotac 50 is activated so that the output shaft rotates clockwise, the left arm 13 can be moved to any position from, for example, a vertical hanging position extending rearwardly to a position extending horizontally out from the shoulder, or to a vertical position with the arm positioned above the head, or a vertical position with the arm extending upward behind the head. The left and right shoulder rotacs are preferably provided with approximately 200 degrees of motion to closely simulate the movement of a human arm in a human shoulder socket.

As shown in FIG. 15, with a robotic torso of the present invention, complex human movement can also be simulated by the combined movement of two or more actuators. For example, under some circumstances it might be desirable to combine a shoulders forward motion with a slight bowing motion to simulate a dejected posture. Likewise, when a human raises an arm above the head, the shoulder to which the arm is attached also rises. This can be simulated by combining the motion of the appropriate shoulder rotac 50, 50' with the adjoining shrug cylinder 60, 60'. The order and extent of a series of such combined or independent motions should be programmable and controllable via computer or microchip 99 to accurately portray many human activities involving movement of the torso.

The rotacs 14, 16, 50, 50' and linear actuators 35, 60, 60', 68, 68' described herein are typically connected to conventional proportional control valves 49, 49', 49", 49''', 61, 61', 61", 61''', 61'''' and electronic controls such as computer/controller 99 that activate and control the movement of the output shafts and pistons of the actuators. The robotic torso 10 is preferably covered with a synthetic shell 74 and skin 76 to simulate the contours, size and appearance of a human torso. The control valves, pumps, air and/or hydraulic hoses, electronic circuit cards, microprocessors, audio generating devices and other components that move and control the motion of the robotic torso 10 can be conveniently and easily mounted within the synthetic shell 74 in the open areas under rotacs 50 and 50'.

Although nine degrees of freedom are shown and described, it is to be understood that an assembly with fewer degrees of freedom may be employed. For example, a torso assembly may be constructed without a torso twist actuator, or a torso forebend actuator or the like.

The invention has been described in terms of the preferred embodiment. One skilled in the art will recognize that it would be possible to construct the elements of the present invention from a variety of materials and to modify the placement of the components in a variety of ways. While the preferred embodiments have been described in detail and shown in the accompanying drawings, it will be evident that various further modifications are possible, and may occur to those having ordinary skill in the art, without departing from the scope of the invention as set forth in the following claims.

We claim:

1. A robotic torso which simulates the appearance and size of a human torso, having an outer shell and an inner structure comprising:
   a base; and
   a first rotary actuator mounted to said base, said rotary actuator having
   a housing with an inner wall defining a generally cylindrical housing chamber of circular cross section having a longitudinal axis,
   a unitary, self-lubricating rotor having a hub defining at least one circular arc surface with at least one radially outwardly extending vane extending from said hub and fitting closely within, and adapted to rotate about the axis of said housing chamber,
   first and second end plates, each attached to said housing,
   housing chamber dividing means equal in number to the number of said vanes and stationary with respect to said housing and said end plates, and,
   an output shaft coupled to said rotor and extending through at least one of said end plates.
   said first rotary actuator oriented on said base so that said output shaft is substantially vertical for rotating the torso to the left and to the right.

2. The robotic torso of claim 1 additionally comprising a second rotary actuator, substantially similar to said first rotary actuator, said second rotary actuator having a housing with a front surface and a bracket, said output shaft of said second rotary actuator being rigidly connected to the output shaft of said first rotary actuator such that the output shaft of the second rotary actuator is substantially horizontal, and such that the housing of said second rotary actuator will rotate to the left and right of the output shaft of the second rotary actuator.

3. The robotic torso of claim 2 additionally comprising a bilateral mounting structure having a front surface, a back surface, a top, and two spaced apart legs, each leg of the bilateral mounting structure being rotatably attached to said bracket of the second rotary actuator to permit the front surface of the bilateral mounting structure to pivot towards and away from the front surface of the second rotary actuator, and a first linear actuator attached between the front surface of the second rotary actuator and the bilateral mounting structure for rotating the legs of the bilateral mounting structure about the bracket of the second rotary actuator.

4. The robotic torso of claim 3 additionally comprising:
   a left plate and a right plate hinged together along a first edge with a hinge pin which is attached to the top of the bilateral mounting structure, said left and right plate each having a top surface and a second end extending away from the hinge pin to the left and right respectively;
   a third rotary actuator having an output shaft, said third rotary actuator pivotally attached to the second end of the left plate using a first pivot pin having a longitudinal axis which is substantially perpendicular to the top surface of the left plate, and oriented so that the output shaft extends to the left away from the bilateral mounting structure, said output shaft capable of rotating an attached left arm structure; and,
   a fourth rotary actuator having an output shaft, said fourth rotary actuator pivotally attached to the second end of the right plate using a second pivot pin having a longitudinal axis which is substantially perpendicular to the top surface of the right plate, and oriented so that the output shaft extends to the right away from the bilateral mounting structure, said output shaft capable of rotating an attached right arm structure.

5. The robotic torso of claim 4 additionally comprising:
   a mounting bracket having a back surface, said mounting bracket extending from the top of the bilateral mounting structure above the third and fourth rotary actuators;
   a second linear actuator attached between the output shaft end of the third rotary actuator and the mounting bracket at a position above the third rotary actuator, such that when the second linear actuator is activated, the left plate will pivot about the hinge pin; and,
   a third linear actuator attached between the output shaft end of the fourth rotary actuator and the mounting bracket at a position above the fourth rotary actuator, such that when the third linear actuator is activated, the right plate will pivot about the hinge pin.

6. The robotic torso of claim 5 additionally comprising:
   a fourth linear actuator attached between the output shaft end of the third rotary actuator and the back surface of the bilateral mounting structure or the back surface of the mounting bracket such that when the fourth linear actuator is activated, the third rotary actuator will pivot about the first pivot pin; and,
   a fifth linear actuator attached between the output shaft end of the fourth rotary actuator and the back surface of the bilateral mounting structure or the back surface of the mounting bracket such that when the fifth linear actuator is activated, the fourth rotary actuator will pivot about the second pivot pin.

7. The robotic torso of claim 1 wherein said first rotary actuator is capable of rotating its output shaft through an arc of up to about 90 degrees.

8. The robotic torso of claim 2 wherein said housing of said second rotary actuator is capable of rotating through an arc of up to about 90 degrees about its output shaft.

9. The robotic torso of claim 3 wherein first linear actuator can rotate said legs of said bilateral mounting structure through an arc of up to about 30 degrees.

10. The robotic torso of claim 4 wherein said output shaft of said third rotary actuator can rotate said attached left arm structure through an arc of up to about 200 degrees, and wherein said output shaft of said fourth rotary actuator can rotate said attached right arm structures through an arc of up to about 200 degrees.

11. The robotic torso of claim 5 wherein said second linear actuator can rotate said left plate about said hinge pin through an arc of up to about 15 degrees, and wherein said third linear actuator can rotate said right plate about said hinge pin through an arc of up to about 15 degrees.

12. The robotic torso of claim 6 wherein said fourth linear actuator can rotate said third rotary actuator about the first pivot pin through an arc of up to about 25 degrees, and wherein said fifth linear actuator can rotate said fourth rotary actuator about the second pivot pin through an arc of up to about 25 degrees.

13. The robotic torso of claim 6 wherein each of said linear actuators are provided with an independent means for control.

14. The robotic torso of claim 13 wherein each said independent means for control is an electrically controlled valve.

15. The robotic torso of claim 13 additionally comprising a means for controlling the second and third linear actuators together, and a means for controlling the fourth and fifth linear actuators together.

16. A robotic torso for simulating the appearance, size and movement of a human torso, and which can be used in conjunction with a leg assembly, a left and right arm assembly, and a head and neck assembly to form a partial or complete robotic human figure, said robotic torso including an outer shell and an inner structure comprising;
   a base;
   a first rotary actuator attached to said base, said rotary actuator having an output shaft oriented so as to be substantially vertical;
   a second rotary actuator having a housing with a front surface, an output shaft, and a mounting surface, said output shaft being rigidly connected to the output shaft of said first rotary actuator such that the output shaft of the second rotary actuator is substantially horizontal;
   a bilateral mounting structure having a front surface, a back surface, a top, and two spaced apart legs, each leg of the bilateral mounting structure being rotatably attached to the mounting surface of the second rotary actuator to permit the front surface of the bilateral mounting structure to pivot towards and away from the front surface of the second rotary actuator;
   a first linear actuator attached between the second rotary actuator and the bilateral mounting structure;
   a left plate and a right plate hinged together along a first edge with a hinge pin which is attached to the top of the bilateral mounting structure, said left and right plate each having a top surface and a second end extending away from the hinge to the left and right respectively;
   a third rotary actuator having an output shaft, said third rotary actuator pivotally attached to the second end of the left plate using a first pivot pin having a longitudinal axis which is substantially perpendicular to the top surface of the left plate, and oriented so that the output shaft extends to the left away from the bilateral mounting structure;
   a fourth rotary actuator having an output shaft, said fourth rotary actuator pivotally attached to the second end of the right plate using a second pivot pin having a longitudinal axis which is substantially perpendicular to the top surface of the right plate, and oriented so that the output shaft extends to the right away from the bilateral mounting structure;
   a mounting bracket having a back surface, said mounting bracket extending from the top of the bilateral mounting structure above the third and fourth rotary actuators;
   a second linear actuator attached between the output shaft end of the third rotary actuator and the mounting bracket at a position above the third rotary actuator, such that when the second linear actuator is activated, the left plate will pivot about the hinge pin;
   a third linear actuator attached between the output shaft end of the fourth rotary actuator and the mounting bracket at a position above the fourth rotary actuator, such that when the third linear actuator is activated, the right plate will pivot about the hinge pin;
   a fourth linear actuator attached between the output shaft end of the third rotary actuator and the back surface of the bilateral mounting structure or the back surface of the mounting bracket such that when the fourth linear actuator is activated, the third rotary actuator will pivot about the first pivot pin; and,
   a fifth linear actuator attached between the output shaft end of the fourth rotary actuator and the back surface of the bilateral mounting structure or the back surface of the mounting bracket such that when the fifth linear actuator is activated, the fourth rotary actuator will pivot about the second pivot pin.

17. The robotic torso of claim 16 wherein the first, second, third and fourth rotary actuators each comprise:
   a housing having an inner wall defining a generally cylindrical housing chamber of circular cross section having a longitudinal axis;
   a unitary, self-lubricating rotor having a hub defining at least one circular arc surface with at least one radially outwardly extending vane extending from said hub and fitting closely within, and adapted to rotate about the axis of said housing chamber;
   first and second end plates, each attached to said housing;
   housing chamber dividing means equal in number to the number of said vanes and stationary with respect to said housing and said end plates; and,
   an output shaft coupled to said rotor and extending through at least one of said end plates.

18. The robotic torso of claim 17 wherein said output shaft is supported from said first end plate by a first bearing and from said second end plate by a second bearing.

19. The robotic torso of claim 17 wherein said rotor is a self lubricating plastic material and the surfaces of said housing and said end plates adjacent said rotor are polished metal.

20. The robotic torso of claim 16 wherein each of said first, second, third, fourth and fifth linear actuators are hydraulic or pneumatic cylinders.

21. The robotic torso of claim 16 wherein each of said linear actuators are provided with an independent means for control.

22. The robotic torso of claim 21 wherein each said independent means for control is an electrically controlled valve.

23. The robotic torso of claim 21 additionally comprising a means for controlling the second and third linear actuators together, and a means for controlling the fourth and fifth linear actuators together.

24. The robotic torso of claim 16 wherein said output shaft of said first rotary actuator and the output shaft of said second rotary actuator can rotate up to about 90 degrees.

25. The robotic torso of claim 16 wherein said output shaft of said third rotary actuator and the output shaft of said fourth rotary actuator can rotate up to about 200 degrees.

26. The robotic torso of claim 16 wherein said first linear actuator can pivot said bilateral mounting structure towards and away from the front surface of the second rotary actuator through an arc of about 30 degrees.

27. The robotic torso of claim 16 wherein said second and third linear actuators can pivot said left and right plates, respectively, about said hinge pin through an arc of about 15 degrees.

28. The robotic torso of claim 16 wherein said fourth and fifth linear actuators can pivot said third and fourth rotary actuators, respectively about said first and second pivot pin, through an arc of about 25 degrees.

29. A robotic torso for use in constructing a robotic figure which simulates the appearance, size and movement of a human being, the robotic torso comprising:
a flexible outer torso shell, for simulating the external appearance, size and shape of a human torso, said flexible outer torso shell having a waist, a left side, a right side, a front, a back, a left shoulder and a right shoulder;
an inner structure contained completely within the outer torso shell, said inner structure including
a means for rotating the torso at the waist about a substantially vertical axis, up to about 45 degrees to the left side and up to about 45 degrees to the right side;
a means for rotating the torso at the waist about a substantially horizontal axis passing through the waist from the front to the back, up to about 45 degrees to the left side and up to about 45 degrees to the right side;
a means for rotating the torso forward and back at the waist, about a substantially horizontal axis passing through the waist from the left side to the right side, up to about 20 degrees from vertical to the front and up to about 10 degrees from vertical to the back;
a means for rotating a left arm attached to the left shoulder about a substantially horizontal axis passing through the shoulder from the left side to the right side up to about 200 degrees;
a means for rotating a right arm attached to the right shoulder about a substantially horizontal axis passing through the right shoulder from the left side to the right side up to about 200 degrees;
a means for vertically raising the left shoulder and right shoulder to provide a shrugging motion; and,
a means for moving the left shoulder and right shoulder horizontally forward or back.

30. The robotic torso of claim 29 wherein the means for rotating the torso at the waist about a vertical axis includes a base and a first rotary actuator attached to said base, said rotary actuator having an output shaft oriented so as to be substantially vertical.

31. The robotic torso of claim 29 wherein the means for rotating the torso at the waist about a horizontal axis passing from the front to the back includes a second rotary actuator having a housing with a front surface and an output shaft which is rigidly connected to the output shaft of said first rotary actuator such that the output shaft of the second rotary actuator is substantially horizontal, such that when said second rotary actuator is activated, the housing rotates about its output shaft causing the torso to bend at the waist, rotating to the left and the right about a substantially horizontal axis passing through the front and back at the waist of the torso.

32. The robotic torso of claim 29 wherein the means for rotating the torso at the waist about a substantially horizontal axis passing through the waist from the left side to the right side includes a pivoting mount attached to a first end of a housing of the second rotary actuator so as to pivot about a substantially horizontal axis passing from left to right through the waist of the torso, a first linear actuator attached between said pivoting mount and said housing of said second rotary actuator, such that when said first linear actuator is activated, the torso will be driven forward or back in a bowing motion.

33. The robotic torso of claim 32 wherein the means for rotating a left arm includes a third rotary actuator having a housing with a first end and a second end and an output shaft extending out from said second end, said third rotary actuator pivotally attached at the first end to the pivoting mount so that said output shaft of third rotary actuator extends away from the torso, said third rotary actuator being attached to pivot about a substantially vertical axis passing from a top of the left shoulder through the bottom, and about a horizontal axis passing through the first end from the front of the torso to the back, thus enabling the housing of said third rotary actuator to move towards the front and back about a substantially vertical axis and up and down about a substantially horizontal axis passing from front to back, and enabling the output shaft of the third rotary actuator to rotate in said housing.

34. The robotic torso of claim 33 wherein the means for rotating a right arm includes a fourth rotary actuator having a housing with a first end and a second end and an output shaft extending out from said second end, said fourth rotary actuator pivotally attached at the first end to the pivoting mount so that said output shaft of said fourth rotary actuator extends away from the torso, said fourth rotary actuator being attached to pivot about a substantially vertical axis passing from a top of the right shoulder through the bottom, and about a horizontal axis passing through the first end from the front of the torso to the back, thus enabling the housing of said fourth rotary actuator to move towards the front and back about a substantially vertical axis and up and down about a substantially horizontal axis passing from front to back, and enabling the output shaft of the fourth rotary actuator to rotate in said housing.

35. The robotic torso of claim 34 wherein said means for vertically raising the left shoulder and right shoulder to provide a shrugging motion includes a mounting bracket having a back surface, said mounting bracket extending from the top of the bilateral mounting structure above the third and fourth rotary actuators, a second linear actuator attached between the output shaft end of the third rotary actuator and the mounting bracket at a position above the third rotary actuator, such that when the second linear actuator is activated, the left plate will pivot about the hinge pin, and a third linear actuator attached between the output shaft end of the fourth rotary actuator and the mounting bracket at a position above the fourth rotary actuator, such that when the third linear actuator is activated, the right plate will pivot about the hinge pin.

36. The robotic torso of claim 35 wherein said means for moving the left shoulder and right shoulder forward or back includes a fourth linear actuator attached between the output shaft end of the third rotary actuator and the back surface of the bilateral mounting structure or the back surface of the mounting bracket, such that when the fourth linear actuator is activated, the third rotary actuator will pivot about the first pivot pin, and a fifth linear actuator attached between the output shaft end of the fourth rotary actuator and the back surface of the bilateral mounting structure or the back surface of the mounting bracket, such that when the fifth linear actuator is activated the fourth rotary actuator will pivot about the second pivot pin.

* * * * *